US012683657B2

(12) United States Patent
Montero Bayo et al.

(10) Patent No.: US 12,683,657 B2
(45) Date of Patent: Jul. 14, 2026

(54) METHODS FOR A COMMUNICATION DEVICE FOR CONTROLLING A RADIATION BOUNDARY AREA, METHOD FOR A NETWORK ENTITY, APPARATUS, VEHICLE AND COMPUTER PROGRAM

(71) Applicant: Volkswagen Aktiengesellschaft, Wolfsburg (DE)

(72) Inventors: Luca Montero Bayo, Barcelona (ES); Andreas Pfadler, Berlin (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 22 days.

(21) Appl. No.: 18/702,675

(22) PCT Filed: Oct. 19, 2022

(86) PCT No.: PCT/EP2022/079077
§ 371 (c)(1),
(2) Date: Apr. 18, 2024

(87) PCT Pub. No.: WO2023/066987
PCT Pub. Date: Apr. 27, 2023

(65) Prior Publication Data
US 2024/0414560 A1 Dec. 12, 2024

(30) Foreign Application Priority Data
Oct. 19, 2021 (DE) .................................. 21203418.5

(51) Int. Cl.
*H04B 7/06* (2006.01)
*H04W 16/28* (2009.01)

(52) U.S. Cl.
CPC .......... *H04B 7/0617* (2013.01); *H04W 16/28* (2013.01)

(58) Field of Classification Search
CPC ............................ H04B 7/0617; H04W 16/28
(Continued)

(56) References Cited

U.S. PATENT DOCUMENTS

| | | | |
|---|---|---|---|
| 2013/0090126 A1* | 4/2013 | Xing .................... | H04B 7/0617 455/452.1 |
| 2013/0223487 A1* | 8/2013 | Zhou .................... | H04B 7/0408 375/219 |

(Continued)

FOREIGN PATENT DOCUMENTS

EP 2892269 A1 7/2015

OTHER PUBLICATIONS

PCT/EP2022/079077. International Search Report & Written Opinion (Mar. 20, 2023).

*Primary Examiner* — Kevin M Burd
(74) *Attorney, Agent, or Firm* — Peter Zura; LOZA & LOZA, LLP

(57) ABSTRACT

Technologies and techniques for controlling a radiation boundary area comprising receiving information about a radiation boundary area and approximating at least one antenna system parameter of the communication device to adjust a radiation pattern of the antenna system to the radiation boundary area. The antenna system may be configured to generate a radiation pattern to radiate into the radiation boundary area using the at least one antenna system parameter and transmitting information about the radiation pattern of the antenna system to a network entity.

20 Claims, 6 Drawing Sheets

(58) Field of Classification Search
USPC .......................................................... 375/262
See application file for complete search history.

(56) References Cited

U.S. PATENT DOCUMENTS

| | | | | |
|---|---|---|---|---|
| 2018/0352553 A1* | 12/2018 | Shtrom | ................ | H04W 72/12 |
| 2020/0037301 A1* | 1/2020 | Park | ................ | H04W 72/0453 |

* cited by examiner

100

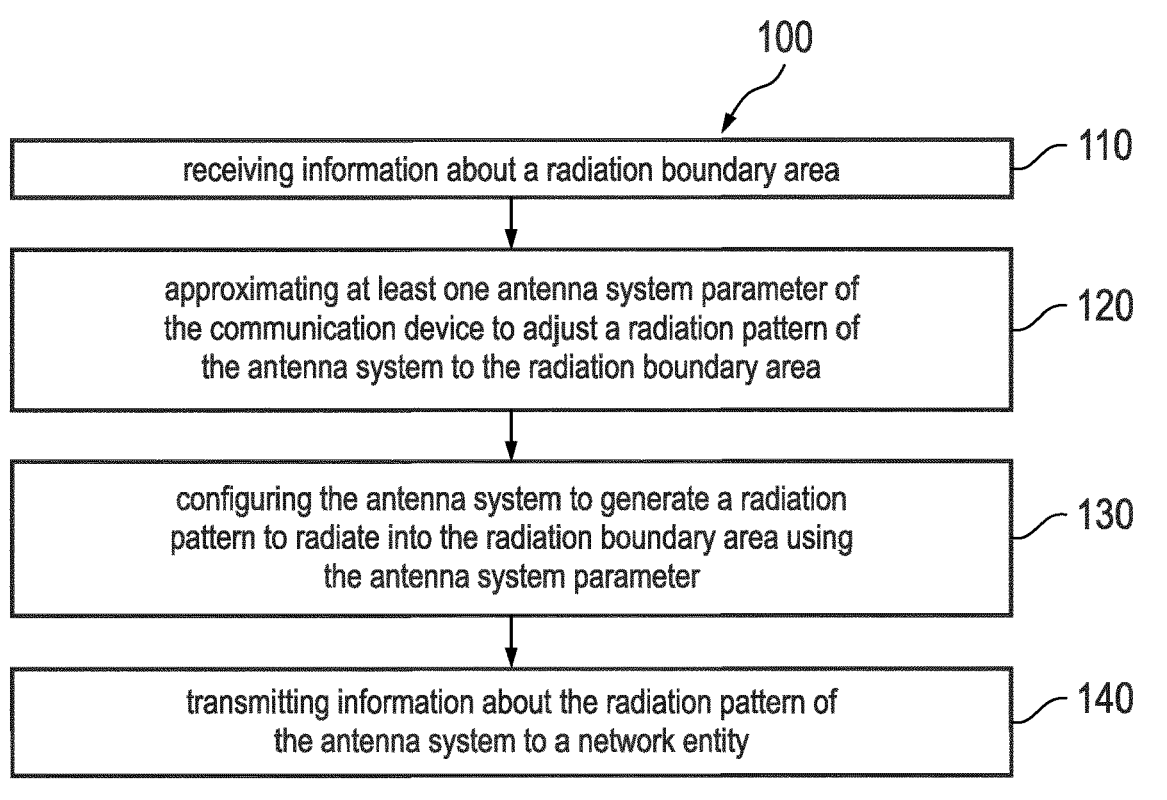

receiving information about a radiation boundary area    110 approximating at least one antenna system parameter of the communication device to adjust a radiation pattern of the antenna system to the radiation boundary area    120 configuring the antenna system to generate a radiation pattern to radiate into the radiation boundary area using the antenna system parameter    130 transmitting information about the radiation pattern of the antenna system to a network entity    140

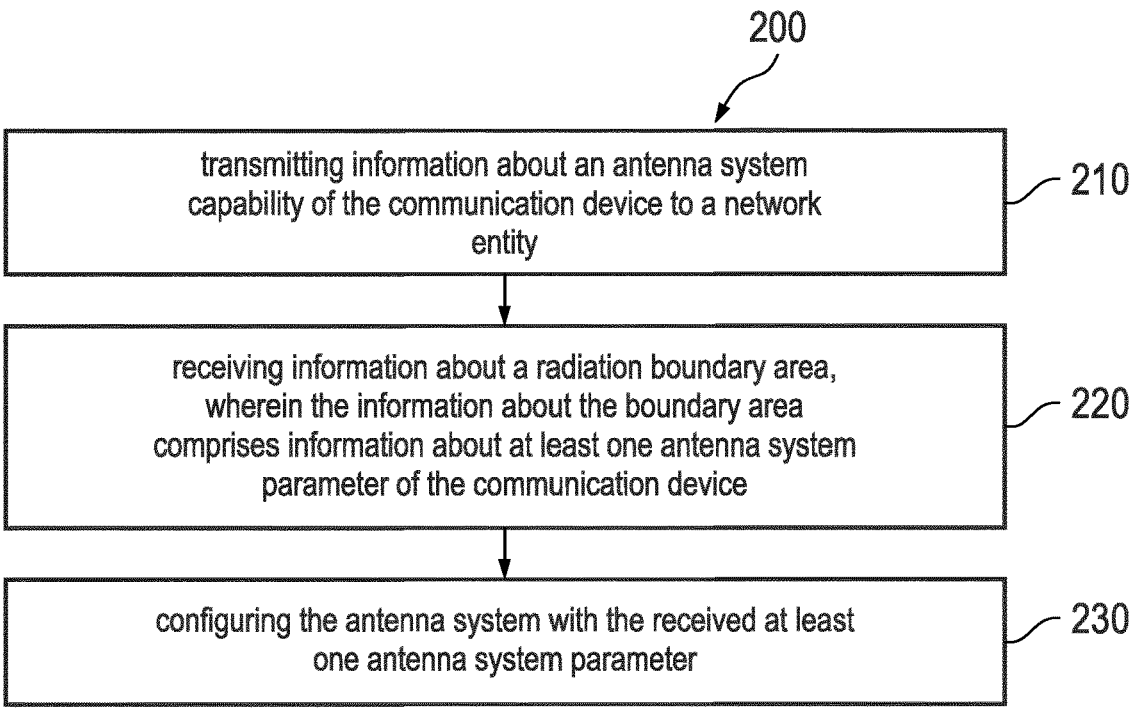

transmitting information about an antenna system capability of the communication device to a network entity    210 receiving information about a radiation boundary area, wherein the information about the boundary area comprises information about at least one antenna system parameter of the communication device    220 configuring the antenna system with the received at least one antenna system parameter    230

Fig. 2

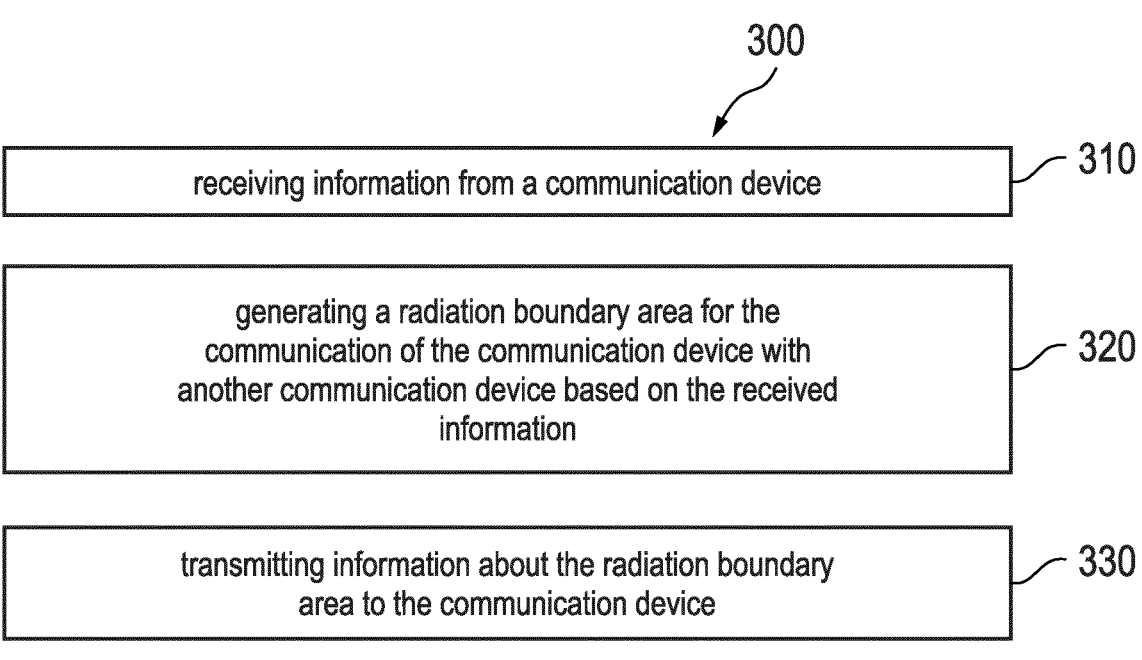

300 receiving information from a communication device    ⌐ 310 generating a radiation boundary area for the
communication of the communication device with
another communication device based on the received
information    ⌐ 320 transmitting information about the radiation boundary
area to the communication device    ⌐ 330

Fig. 3

400 receiving from the other communication device a
radiation boundary area to communicate with the other
and/or a further communication device    ⌐ 410 communicating using the received radiation boundary
area    ⌐ 420

Omnidirectional     Beam-based     Beam-shaped

Fig. 8b
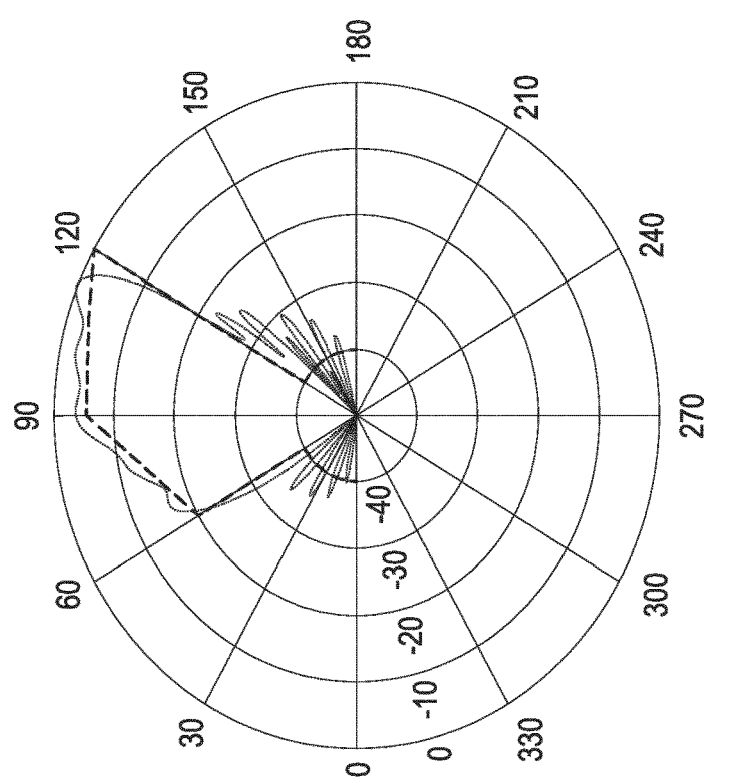
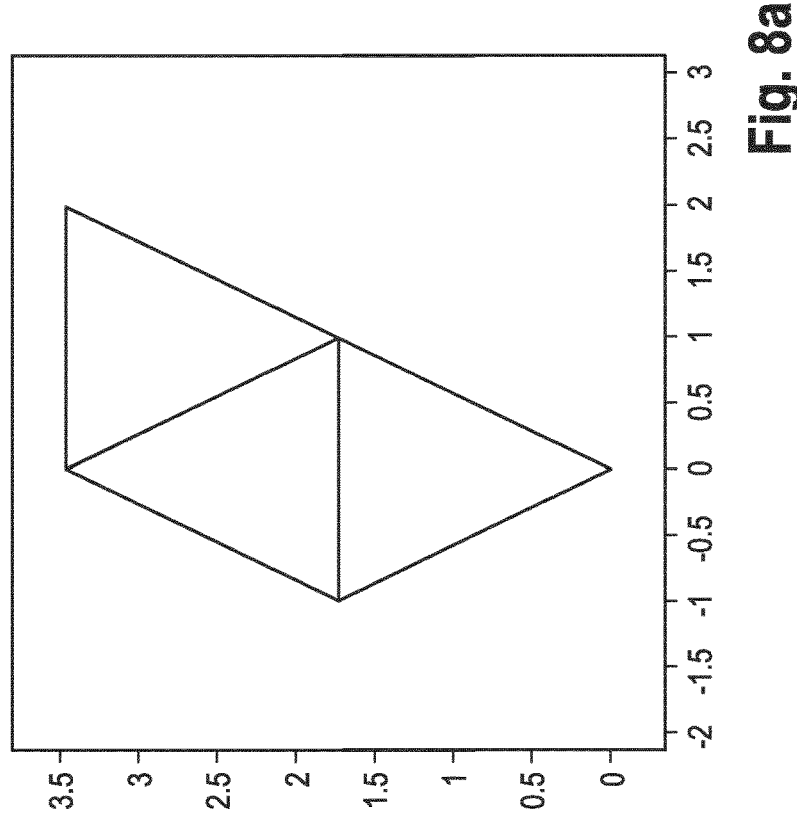
Fig. 8a

1

METHODS FOR A COMMUNICATION DEVICE FOR CONTROLLING A RADIATION BOUNDARY AREA, METHOD FOR A NETWORK ENTITY, APPARATUS, VEHICLE AND COMPUTER PROGRAM

RELATED APPLICATIONS

The present application claims priority to International Patent Application No. PCT/EP2022/079077 to Montero Bayo et al., filed Oct. 19, 2022, titled "Methods For A Communication Device For Controlling A Radia-Tion Boundary Area, Method For A Network Entity, Apparatus, Vehicle And Computer Program," which claims priority to European Pat. App. No. EP 21203418.5, filed Oct. 19, 2021, to Montero Bayo et al., the contents of each being incorporated by reference in their entirety herein.

TECHNICAL FIELD

The present disclosure relates to the field of wireless communication. Embodiments relate to methods for a communication device for controlling a radiation boundary area, a method for a network entity, an apparatus, a vehicle and a computer program, more particularly, but not exclusively, to technologies and techniques for controlling a communication between a communication device and another communication device, for example, to adjust a radiation boundary area used by the communication devices for communication with the other communication device.

BACKGROUND

The development of 5G has brought increased attention to the automotive industry as a vertical manufacturer expected to leverage the most advanced features of the new generation of wireless communications. Among the main novelties of 5G, a wide range of spectrum possibilities (currently licensed up to the 28 GHz band—the first-ever Millimeter wave band for mobile use), enhanced support for high mobility scenarios and new mechanisms to guarantee and predict the experienced Quality of Service (QoS), have been established as key functions to support an increasingly connected transportation ecosystem. Besides, the latest standard release (Rel. 16) has given support to Vehicle-to-Everything (V2X) communications with New Radio (NR) technology, allegedly allowing vehicles to make use of the same spectrum options, even for Vehicle-to-Vehicle (V2V) use cases.

Providing the NR support of V2X, vehicles are also capable of communicating at frequencies above 6 GHz. In 5G, these higher frequency bands are allocated at the mmWave range of the spectrum (30-300 GHz). The use of higher frequency bands in communications implies propagating in a harsher channel, where the free-space path loss scales with $(f^2)$, and shading by obstacles and atmospheric effects (e.g., water vapor and oxygen absorption, or rain) take a non-negligible role. Services relying on higher frequency systems, with their inherently high channel-induced attenuation, might find challenging to deliver satisfactory QoS in some situations where signal power attenuation is increased, lowering the received Signal-to-Noise Ratio. As a result, 5G User Equipment (UE) is reliant on multi-antenna front ends to perform beamforming and focus the radiate power towards the intended transmitter/receiver. It is thus worth considering that vehicles may be equipped with an advanced multi-antenna system.

US 2010/0246 377 A1 discloses a multiple-input multiple-output beamforming-based single carrier frequency division multiple access system. At the transmitter, a fast Fourier transform is performed on transmission data to generate frequency domain data. The frequency domain data is mapped to assigned subcarriers. An inverse fast Fourier transform is performed on the transmit data mapped to the assigned subcarriers to generate time domain transmit data. The time domain transmit data is transmitted via antennas. At a receiver, an FFT is performed on the received data to generate frequency domain received data.

When using directive antennas instead of omnidirectional antennas, undesired radiation towards a wide region in (angular) space is minimized and thus interference exerted towards other users can be potentially reduced. This can enhance the rate of time and frequency resource reuse and increase the Quality of Service of the links. However, this paradigm requires increased knowledge by all nodes or at least one node (e.g., base station) that can intelligently manage these resources. As the radiation from nodes shifts from omnidirectional to beam-based, the footprint of the antenna system patterns projected in space is a resource to plausible to work with, and it is thus worth considering that space itself might also be allocated in the scheduling strategies for future communications. The allocation of the space and the determination of the shape of the space allocated is important for a performance of the nodes in a mobile communication system.

SUMMARY

As such, the present disclosure utilizes a determination/generation of a radiation boundary area that may depend on information provided by a communication device, e.g., an achievable antenna (system) radiation pattern. This way, space in an environment can be used more efficiently, e.g., by adjusting a radiation boundary area to an antenna (system) capability of a communication device, which shall use the radiation boundary area.

In some examples, a method is disclosed for a communication device for controlling a radiation boundary area. The method comprises receiving information about a radiation boundary area and approximating at least one antenna system parameter of the communication device to adjust a radiation pattern of the antenna system to the radiation boundary area. Further, the method comprises configuring the antenna system to generate a radiation pattern to radiate into the radiation boundary area using the at least one antenna system parameter and transmitting information about the radiation pattern of the antenna system to a network entity. Thus, the network entity can be informed about a used antenna system pattern of the antenna system of the communication device and may determine a match between the radiation pattern and the radiation boundary area. This way, the network entity may be enabled to adjust the radiation boundary area to the radiation pattern of the communication device, e.g., if a deviation of the radiation pattern from the radiation boundary area exceeds a threshold.

The method may further comprise generating a quality metric, which indicates a match of the radiation pattern with the radiation boundary area and transmitting the quality metric to the network entity. This way, the network entity can be informed about a match directly, which may omit a determination of the match by the network entity.

The method may further comprise receiving a threshold for a maximal radiation energy density outside the radiation boundary area and configuring the antenna system to generate the radiation pattern such that it does not exceed the maximal radiation energy density outside the radiation boundary area. This way, it can be guaranteed that the radiation pattern of the communication device does not impacts other communication outside the radiation boundary area.

In an example, approximating the at least one antenna system parameter may comprise determining Fourier Coefficients to adjust the radiation pattern of the antenna system to the radiation boundary area. This way, an improved calculation of the radiation pattern can be achieved.

The method may further comprise determining information about an environment and transmitting the information about the environment to the network entity. This way, the environment can be considered by the network entity for generating the radiation boundary area, e.g., a shielding of an obstacle may limit the radiation boundary area.

In some examples, another method is disclosed for a communication device for controlling a radiation boundary area. The method comprises re-transmitting information about an antenna system capability of the communication device to a network entity and receiving information about a radiation boundary area, wherein the information about the boundary area comprises information about at least one antenna system parameter of the communication device. Further, the method comprises configuring the antenna system with the received at least one antenna system parameter. Thus, the communication device may be enabled to configure its antenna system in an eased way. For example, configuring the antenna system can be based on the received at least one antenna system parameter and a determination of an antenna system parameter suitable for the radiation boundary area by the communication device can be avoided.

In some examples, another method is disclosed for a network entity for improving a radiation boundary area. The method comprises receiving information from a communication device and generating a radiation boundary area for the communication of the communication device with another communication device based on the received information. Further, the method comprises transmitting information about the radiation boundary area to the communication device. Thus, the network entity can be informed by the communication device about, e.g., a restriction (e.g., an antenna system capability, an obstacle, a radiation pattern, etc.), which can be used to generate the radiation boundary area. This way, the radiation boundary area can be generated in an improved way.

The received information may comprise information about an antenna system capability of the communication device and the radiation boundary area may be generated based on the antenna system capability of the communication device. This way, the radiation boundary area can be adjusted to the antenna system capability of the communication device.

The received information may also comprise information about a radiation pattern of the communication device and the radiation boundary area may be generated based on the radiation pattern of the communication device. This way, the radiation boundary area can be adjusted to the radiation pattern of the communication device.

The received information may comprise information about a movement speed of the communication device and the radiation boundary area may be generated based on the movement speed of the communication device. This way, the radiation boundary area can be adjusted to a dynamic situation.

The received information may also comprise information about an environment of the communication device and the radiation boundary area may be generated based on the environment of the communication device. This way, the radiation boundary area can be adjusted to the environment, e.g., to a radiopaque obstacle.

In some examples, a method for a communication device connected to another communication device is disclosed for improving a device-to-device communication. The method comprises receiving from the other communication device a radiation boundary area to communicate with the other and/or a further communication device and communicating using the received radiation boundary area. This way, the communication device can be informed by the other communication device about the radiation boundary area even if the communication device is not communicatively connected to the (controlling) network entity.

In some examples, an apparatus is disclosed, comprising one or more interfaces configured to communicate with a communication device or user equipment. The apparatus further comprises processing circuitry configured to control the one or more interfaces and to perform the method for user equipment and/or a communication device described above.

In some examples, a vehicle is disclosed, comprising any of the apparatuses as described herein.

IN some examples, a computer program is disclosed, having a program code for performing any of the methods described herein, when the computer program is executed on a computer, a processor, or a programmable hardware component.

DESCRIPTION OF THE DRAWINGS

Some examples of apparatuses and/or methods will be described in the following by way of example only, and with reference to the accompanying figures, in which FIG. 1 shows an example of a method for a communication device, according to some aspects of the present disclosure;

FIG. 2 shows an example of another method for a communication device, according to some aspects of the present disclosure;

FIG. 3 shows an example of a method for a network entity, according to some aspects of the present disclosure;

FIG. 4 shows an example of another method for a communication device, according to some aspects of the present disclosure;

FIG. 8 shows an example of a triangular grid-base radiation boundary area and an array factor limit representation, according to some aspects of the present disclosure.

DETAILED DESCRIPTION

Figure 5:
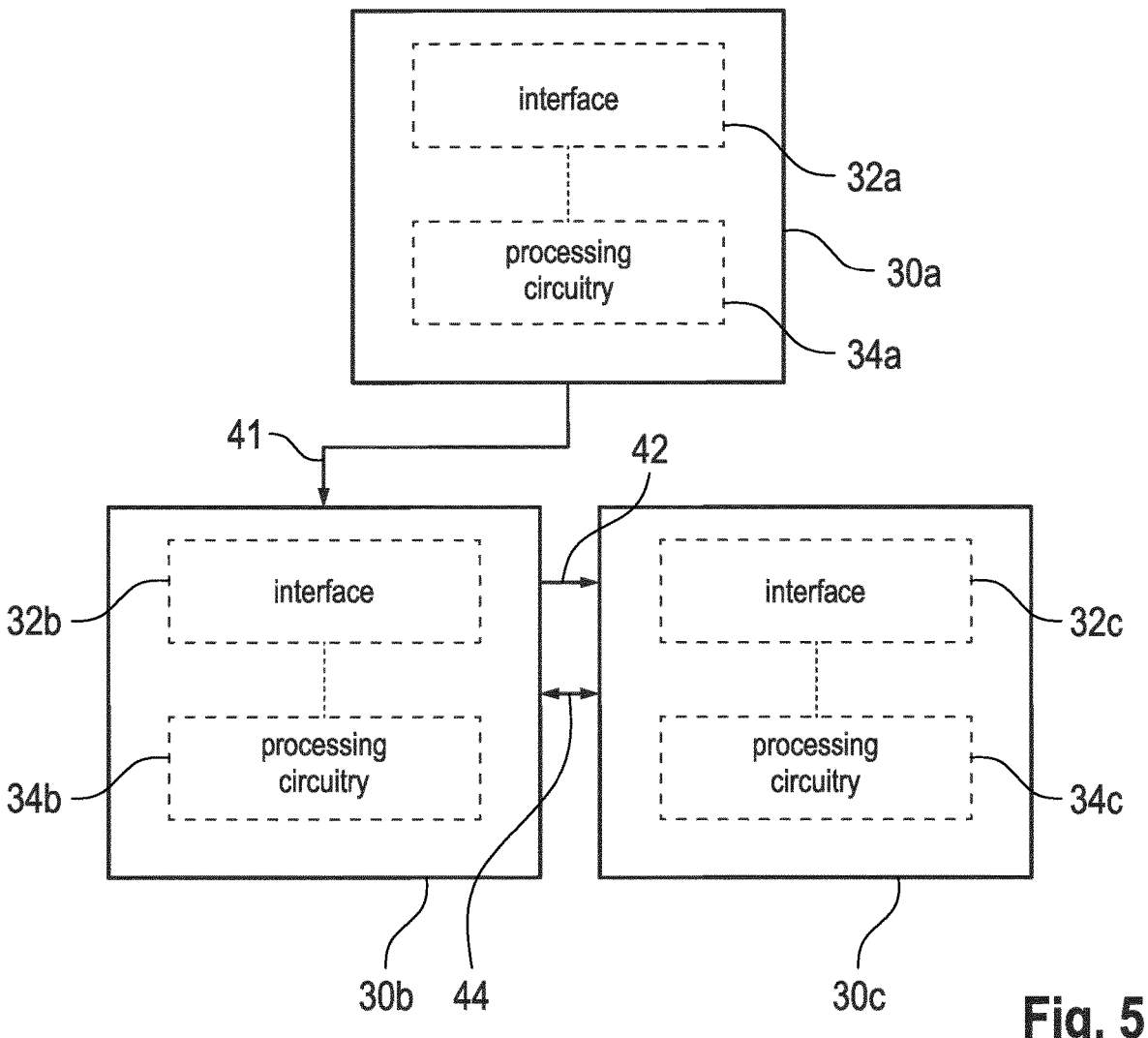
FIG. 5 shows a block diagram of a mobile communication system, according to some aspects of the present disclosure.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, e.g., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 shows an example of a method 100 for a communication device. The method 100 for controlling a radiation boundary area comprises receiving 110 information about a radiation boundary area and approximating 120 at least one antenna system parameter of the communication device to adjust a radiation pattern of the antenna system to the radiation boundary area. Further, the method 100 comprises configuring 130 the antenna system to generate a radiation pattern to radiate into the radiation boundary area using the at least one antenna system parameter and transmitting 140 information about the radiation pattern of the antenna system to a network entity. Thus, the communication device can inform the network entity about the radiation pattern, which may enable the network entity to improve a generation/determination of the radiation boundary area.

The communication device may communicate in a mobile communication system with the network entity, e.g., a base station. For example, the communication device and the network entity may communicate in/via a mobile communication system. The mobile communication system may comprise a plurality of transmission points and/or base stations operable to communicate radio signals with the communication device. In an example, the mobile communication system may comprise the communication device and the network entity.

The network entity may be configured in the fixed or stationary part of the network or system. A network entity may correspond to a remote radio head, a transmission point, an access point, a macro cell, a small cell, a micro cell, a pico cell, a femto cell, a metro cell etc. The term small cell may refer to any cell smaller than a macro cell, e.g., a micro cell, a pico cell, a femto cell, or a metro cell. Moreover, a femto cell is considered smaller than a pico cell, which is considered smaller than a micro cell. A network entity can be a wireless interface of a wired network, which enables transmission and reception of radio signals to a communication device. Such a radio signal may comply with radio signals as, for example, standardized by 3GPP or, generally, in line with one or more of the above listed systems. Thus, a network entity may correspond to a NodeB, an eNodeB, a BTS, an access point, etc.

The mobile communication system may be cellular. The term cell refers to a coverage area of radio services provided by a transmission point, a remote unit, a remote head, a remote radio head, communication device, network entity or a NodeB, an eNodeB, respectively. The terms cell and base station may be used synonymously. A wireless communication device, e.g., the communication device, can be registered or associated with at least one cell (e.g., the network entity), e.g., it can be associated to a cell such that data can be exchanged between the network and the mobile in the coverage area of the associated cell using a dedicated channel, connection or connection.

In general, the communication device may be considered a device that is capable of communicating wirelessly. In particular, however, the communication device may be a mobile communication device, e.g., a communication device that is suitable for being carried around by a user. For example, the communication device may be a User Terminal (UT) or User Equipment (UE) within the meaning of the respective communication standards being used for mobile communication. For example, the communication device may be a mobile phone, such as a smartphone, or another type of mobile communication device, such as a smartwatch, a laptop computer, a tablet computer, or autonomous augmented-reality glasses. For example, the communication device and the network entity may be configured to communicate in a cellular mobile communication system. Accordingly, the communication device and the network entity may be configured to communicate in a cellular mobile communication system, for example in a Sub-6 GHz-based cellular mobile communication system (covering frequency bands between 500 MHz and 6 GHz) or in a mmWave-based cellular mobile communication system (covering frequency bands between 20 GHz and 60 GHz). For example, the communication device and the network entity may be configured to communicate in a mobile communication system/cellular mobile communication system. In general, the mobile communication system may, for example, correspond to one of the Third Generation Partnership Project (3GPP)-standardized mobile communication networks, where the term mobile communication system is used synonymously to mobile communication network. The mobile communication system may correspond to, for example, a 5th Generation system (5G), a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

In addition the communication device/network entity may be suitable for, or configured to, communicating/communicate via non-cellular communication systems, e.g., via a device-to-device vehicular communication system, e.g., according to the IEEE 802.11p standard (Institute of Electrical and Electronics Engineers standard 802.11p for vehicular communication) or via a wireless local area network (e.g., according to IEEE 802.11a, IEEE 802.11b, IEEE 802.11g, IEEE 802.11n, IEEE 802.11ac or IEEE 802.1ax, also known as Wi-Fi 1 through Wi-Fi 6(E)). In particular, the communication device and the network entity may be suitable for, or configured to, communicating/communicate in the frequency band between 5 GHz and 7.1 GHz, which covers communication in the 5 GHz band (for WiFi in the 5 GHz band), 5.9 GHz band (for vehicular communication according to the 802.11p standard) and between 5.9 GHz and 7.1 GHz (for WiFi in the 6 GHz band).

A connection between the communication device and the network entity may be a wireless connection, e.g., a mmWave-based connection over the mobile communication system (e.g., using carrier frequencies of at least 20 GHz) or may be performed at lower carrier frequencies, e.g., using carrier frequencies of at most 7.5 GHz. For example, the wireless connection between the communication device and the network entity may be initiated using the protocols of the mobile communication system, or using a short-range communication system, such as via a wireless local area network outlined above.

As is evident from the above example, while the communication between first/second communication device and network entity and/or between first communication device and second communication device occurs via the mobile communication system, additional communication and/or alternatively communication (e.g., the first and the second communication device is a vehicle) between the communication device and the network entity may occur via a vehicular communication system. Such communication may be carried out directly, e.g., by means of Device-to-Device (D2D) communication. Such communication may be carried out using the specifications of the vehicular communication system. An example of D2D is direct communication between vehicles, also referred to as Vehicle-to-Vehicle communication (V2V) or Vehicle-to-Everything (V2X), car-to-car, Dedicated Short Range Communication (DSRC), respectively. Technologies enabling such D2D-communication include 802.11p, 3GPP systems (4G, 5G, NR and beyond), etc.

The radiation boundary area referred to herein may be a space in the environment which is used for communication by the communication device. For example, a radiation energy density caused by the communication device may be outside the radiation boundary area below a threshold, e.g., below a maximal allowed background radiation energy density which does not interfere the communication of other communication devices. For example, a radiation energy density of a transmission of the communication device used for communication (e.g., with another communication device) using the radiation boundary area can be neglected outside of the radiation boundary area.

Receiving 110 the information about a radiation boundary area may be performed by any suitable message, e.g., by a broadcast message, groupcast message or unicast message. Thus, the information about a radiation boundary area can be received in a desired way, e.g., using a unicast message.

Approximating 120 at least one antenna system parameter of the communication device to adjust a radiation pattern of the antenna system to the radiation boundary area may be performed by a processing unit of the communication device by calculating and/or loading data. The processing unit may calculate the at least one antenna system parameter to adjust the antenna system, e.g., based on Fourier Coefficients, for example. For example, the processing unit may load data about the at least one antenna system parameter, e.g., from a data storage media, e.g., by use of a databank, a look-up table, etc. Optionally, the communication device may consider an environment of its own to determine the radiation pattern. For example, the radiation pattern is not solely a reflection of a possible achievable/adjustable radiation pattern, but rather a reflection of the real radiation pattern influenced, e.g., by obstacles such like other communication device, infrastructure, etc., especially inside or at an edge of the radiation boundary area. For example, at an edge of the radiation boundary area may be a radiopaque structure arranged, e.g., a house. Thus, for approximating 120 the at least one antenna system parameter this radiopaque structure can be considered, e.g., a radiation energy density at this edge of the radiation boundary area can be chosen as necessary, since the radiopaque structure may block radiation at this edge and may ensure that the radiation energy density outside the radiation boundary area is below a threshold.

Configuring 130 the antenna system to generate a radiation pattern to radiate into the radiation boundary area using the at least one antenna system parameter may be done by the processing unit. The radiation pattern may be generated in a way that a radiation energy density outside the radiation boundary area is not exceeded. Optionally, the radiation pattern may be generated such that a minimal radiation energy density inside the boundary area can be achieved, especially for a predefined position in the radiation boundary area, e.g., for a position of another communication device.

Transmitting 140 information about the radiation pattern of the antenna system to a network entity can be performed by any suitable message, e.g., by a broadcast message, groupcast message or unicast message. Thus, the information about the radiation pattern can be transmitted in a desired way, e.g., using a broadcast message to transmit the information about the radiation pattern to the network entity. For example, if the network entity is a vehicle and the communication device is another vehicle the information about the radiation pattern may be transmitted via V2X communication.

In some examples, the method 100 may further comprise generating a quality metric, which indicates a match of the radiation pattern with the radiation boundary area and transmitting the quality metric to the network entity. This way, a control parameter for the quality of the radiation pattern with respect to the radiation boundary area can be determined. This control parameter can be transmitted 140 to the network entity (e.g., the control parameter may be the information about the radiation pattern transmitted 140 to the network entity) and may reduce data traffic and/or computational efforts on the side of the network entity.

The quality metric may be independent of or depend on the environment of the communication device. For example, if the quality metric may be independent of the environment the quality metric may be a measure for the match of the radiation boundary area with an achievable/adjustable radiation pattern. For example, the quality metric may depend on the environment such that the quality metric may be a measure for the match of the real radiation pattern (e.g., influenced by obstacles) with the radiation boundary area.

In some examples, the method 100 may further comprise receiving a threshold for a maximal radiation energy density outside the radiation boundary area and configuring the antenna system to generate the radiation pattern such that it does not exceed the maximal radiation energy density outside the radiation boundary area. This way, interference outside the radiation boundary area, e.g., in an adjacent radiation boundary area can be reduced or even omitted, since the radiation energy density is below the threshold. For example, the threshold may be a maximal radiation energy density which does not influence communication between other communication devices outside the radiation boundary area.

In some examples, approximating 120 the at least one antenna system parameter may comprise determining Fourier Coefficients to adjust the radiation pattern of the antenna system to the radiation boundary area. This way, the at least one antenna system parameter can be determined by a well-known method, which may improve a usability for the network entity.

In some examples, the method 100 may further comprise determining information about an environment and transmitting the information about the environment to the network entity. This way, the network entity may utilize the information about the environment to adjust the generation of the radiation boundary area. For example, the communication device (e.g., a vehicle) may use a wide variety of on-board sensor data types, including radar sensor data and lidar sensor data, but also, e.g., vision-related sensors such as camera and IR sensors, as well as ultrasound sensors to determine the positions of the communication devices to determine information used to determine information for the predicted performance. For example, the network entity may adjust a radiation boundary area such that an obstacle may be arranged outside the radiation boundary area. For example, the network entity may adjust a radiation boundary area such that a radiopaque obstacle is arranged at an edge of the radiation boundary area. This way, the configuration of the antenna system of the communication device can be eased, since the radiation pattern at this edge can be neglected because it is blocked by the radiopaque obstacle from the outside of the radiation boundary area.

More details and aspects are mentioned in connection with the embodiments described above and/or below. The example shown in FIG. 1 may comprise one or more optional additional features corresponding to one or more aspects mentioned in connection with the proposed concept or one or more examples described below (e.g., FIG. 2-8).

FIG. 2 shows an example of another method 200 for a communication device. The method 200 for controlling a radiation boundary area comprises transmitting 210 information about an antenna system capability of the communication device to a network entity and receiving 220 information about a radiation boundary area. The information about the boundary area comprises information about at least one antenna system parameter of the communication device. Further, the method 200 comprises configuring 230 the antenna system with the received at least one antenna system parameter. This way, the communication device can be enabled to utilize a radiation boundary area without being informed about the radiation boundary area, rather being informed about the at least one antenna system parameter, which may reduce a data traffic and/or may omit an approximation of the at least one antenna system parameter on the side of the communication device.

Optionally, the communication device may further receive information about a usage time of the at least one antenna system parameter. For example, the network entity may inform the communication device that the at least one antenna system parameter can be used for a predefined time, e.g., 5 s, 10 s, 15 s, etc. The predefined time may depend on the environment of the communication device and/or on a dynamic information about the environment (e.g., a movement of the communication device, a movement speed of a mobile obstacle, a planned route of the communication device, etc.). For example, the communication device may further transmit information needed to determine the predefined time to the network entity (e.g., the communication device may transmit a movement speed of its own, a planned route of its own, etc.).

More details and aspects are mentioned in connection with the embodiments described above and/or below. The example shown in FIG. 2 may comprise one or more optional additional features corresponding to one or more aspects mentioned in connection with the proposed concept or one or more examples described above (FIG. 1) and/or below (e.g., FIG. 3-8).

FIG. 3 shows an example of a method 300 for a network entity. The method 300 for improving a radiation boundary area comprises receiving 310 information from a communication device and generating 320 a radiation boundary area for the communication of the communication device with another communication device based on the received information. Further, the method 300 may further comprise transmitting 330 information about the radiation boundary area to the communication device. This way, the network entity may generate a radiation boundary area which is adjusted to the communication device. For example, the information from the communication may comprise information about a radiation pattern which can be achieved/adjusted by an antenna system of the communication device, an antenna system capability, a quality metric, a combination thereof, etc. The network entity may be the counterpart of the communication device described with reference to FIG. 1 and FIG. 2.

For example, the network entity may receive 310 from the communication device information about an achieved radiation pattern of the antenna system of the communication device. The radiation pattern may differ from an originally transmitted radiation boundary area and thus the network entity may adjust the radiation boundary area by generating 320 a (new/improved) radiation boundary area. This (new/improved) radiation boundary area may better match the achievable radiation pattern of the communication device and may be transmitted 330 to the communication device. This way, the radiation boundary area can be improved to the specific communication device, e.g., the antenna system of the communication device.

In some examples, the received information may comprise information about an antenna system capability of the communication device. Further, the radiation boundary area may be generated based on the antenna system capability of the communication device. This way, the network entity can directly adjust the radiation boundary area to the antenna system capability of the communication device. Optionally or alternatively, the information about the antenna system capability may be information about a model/type of the communication device, which enables the network entity to determine the antenna system capability (e.g., using a databank). This way, data traffic can be reduced.

In some examples, the received information may comprise information about a radiation pattern of the communication device. Further, the radiation boundary area may be generated based on the radiation pattern of the communication device. This way, the network entity can directly adjust the radiation boundary area to the radiation pattern of the communication device.

In some examples, the received information may comprise information about a movement speed of the communication device. Further, the radiation boundary area may be generated based on the movement speed of the communication device. This way, the radiation boundary area can be adjusted, e.g., to increase a usage time, a reliability, etc. For example, for a communication with a lower movement speed a size of the radiation boundary area may be decreased in comparison to the size of the radiation boundary area for a communication device with a higher movement speed. For example, the size of the radiation boundary area may be increased for a moving communication device to increase a usage time of the radiation boundary area. Optionally or alternatively, the radiation boundary area may be generated based on a movement speed of the desired communication partner of the communication device using the radiation boundary area.

In some examples, the received information comprises information about an environment of the communication device. Further, the radiation boundary area is generated based on the environment of the communication device. This way, the network entity can directly adjust the radiation boundary area to the radiation pattern of the communication device.

More details and aspects are mentioned in connection with the embodiments described above and/or below. The example shown in FIG. 3 may comprise one or more optional additional features corresponding to one or more aspects mentioned in connection with the proposed concept or one or more examples described above (FIGS. 1-2) and/or below (e.g., FIGS. 4-8).

FIG. 4 shows an example of another method for a communication device. The method 400 for a communication device connected to another communication device for improving a device-to-device communication comprises receiving 410 from the other communication device a radiation boundary area to communicate with the other and/or a further communication device and communicating 420 using the received radiation boundary area. This way, the communication device can be informed about the radiation boundary area allocated by a (controlling) network entity without a need for a communicative connection to the network entity.

More details and aspects are mentioned in connection with the embodiments described above and/or below. The example shown in FIG. 4 may comprise one or more optional additional features corresponding to one or more aspects mentioned in connection with the proposed concept or one or more examples described above (FIGS. 1-3) and/or below (e.g., FIG. 5-8).

FIG. 5 shows a block diagram of a mobile communication system. The mobile communication system comprises three apparatuses 30a, 30b, 30c. Each apparatus 30a, 30b, 30c comprises one or more interfaces 32a, 32b, 32c configured to communicate with a communication device or user equipment. Each apparatus 30a, 30b, 30c further comprises processing circuitry 34a, 34b, 34c configured to control the one or more interfaces and to perform the methods for the (first) communication device 30b (connection established to the network entity) as described above (e.g., described with reference to FIG. 1 and FIG. 2), the method for the network entity 30a as described above (e.g., described with reference to FIG. 3) and/or the method for the (second) communication device 30c (no connection established to the network entity) as described above (e.g., described with reference to FIG. 4).

For example, the apparatus 30a, 30b, 30c can be comprised by a vehicle. For example, the vehicle may be a land vehicle, such a road vehicle, a car, an automobile, an off-road vehicle, a motor vehicle, a bus, a robo-taxi, a van, a truck or a lorry. Alternatively, the vehicle may be any other type of vehicle, such as a train, a subway train, a boat or a ship. For example, the proposed concept may be applied to public transportation (trains, bus) and future means of mobility (e.g., robo-taxis).

The network entity 30a may be communicatively coupled to the first communication device 30b. The network entity 30a may allocate a radiation boundary area to the first communication device 30b and may transmit 41 information about the allocated radiation boundary area to the first communication device 30b. The first communication device 30b may transmit 42 information about the allocated radiation boundary area to the second communication device 30c. The first communication device 30b and the second communication device 30c may communicate 44 with each other using the allocated radiation boundary area.

As shown in FIG. 5, the respective one or more interfaces 32a, 32b, 32c are coupled to the respective processing circuitry 34a, 34b, 34c at the apparatus 30a, 30b, 30c. In examples the processing circuitry 34a, 34b, 34c may be implemented using one or more processing units, one or more processing devices, any means for processing, such as a processor, a computer or a programmable hardware component being operable with accordingly adapted software. Similar, the described functions of the processing circuitry 34a, 34b, 34c may as well be implemented in software, which is then executed on one or more programmable hardware components. Such hardware components may comprise a general-purpose processor, a Digital Signal Processor (DSP), a micro-controller, etc. The processing circuitry 34a, 34b, 34c is capable of controlling the interface 32a, 32b, 32c, so that any data transfer that occurs over the interface and/or any interaction in which the interface may be involved may be controlled by the processing circuitry 34a, 34b, 34c. For example, the apparatus 30a, 30b, 30c can be comprised by a vehicle. For example, the vehicle may be a land vehicle, such a road vehicle, a car, an automobile, an off-road vehicle, a motor vehicle, a bus, a robo-taxi, a van, a truck or a lorry. Alternatively, the vehicle may be any other type of vehicle, such as a train, a subway train, a boat or a ship. For example, the proposed concept may be applied to public transportation (trains, bus) and future means of mobility (e.g., robo-taxis).

In some examples, the apparatus 30a, 30b, 30c may comprise a memory and at least one processing circuitry 34a, 34b, 34c operably coupled to the memory and configured to perform the below mentioned method.

In some examples, the one or more interfaces 32a, 32b, 32c may correspond to any means for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, e.g., transmit or receive signals, information with further internal or external components. The one or more interfaces 32a, 32b, 32c may comprise further components to enable communication between vehicles. Such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc.

More details and aspects are mentioned in connection with the embodiments described above and/or below. The example shown in FIG. 5 may comprise one or more optional additional features corresponding to one or more aspects mentioned in connection with the proposed concept or one or more examples described above (FIGS. 1-4) and/or below (e.g., FIGS. 6-8).

Figure 6:
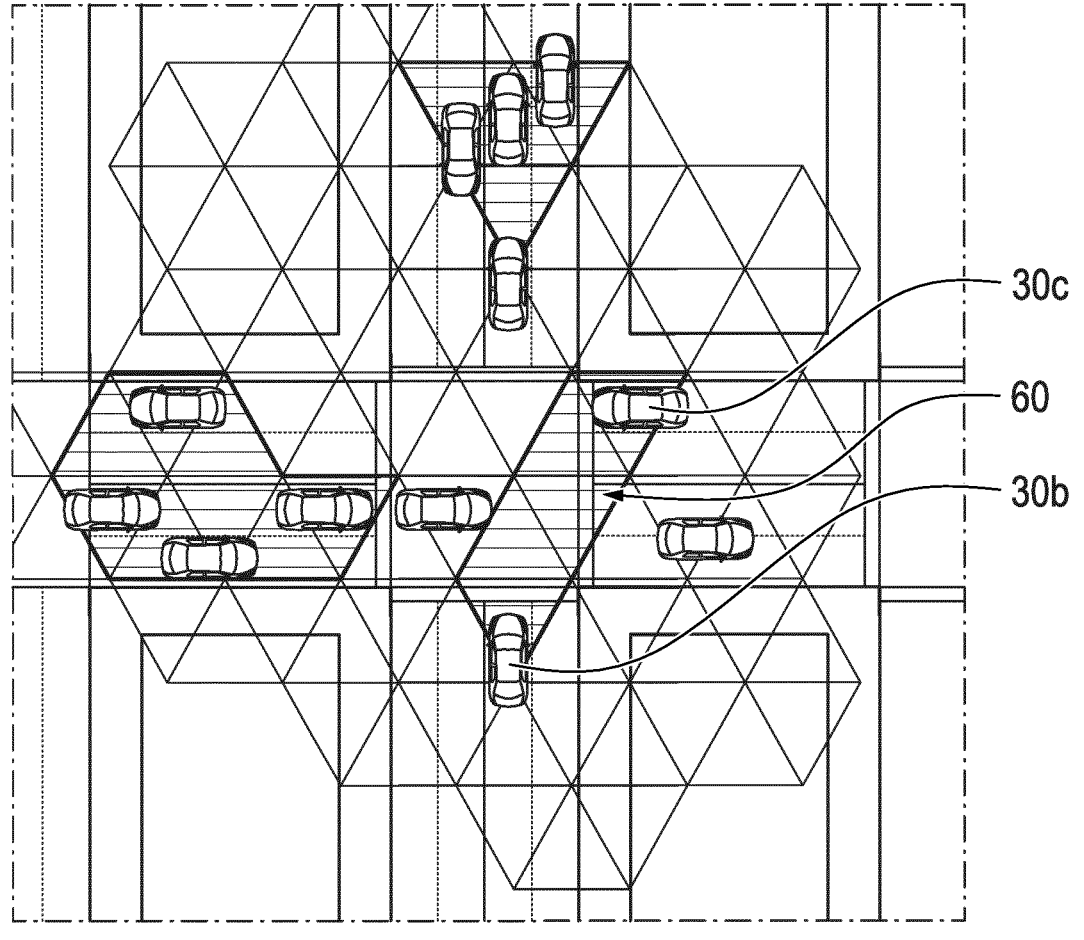
FIG. 6 shows an example for communication between a plurality of communication devices, according to some aspects of the present disclosure.

FIG. 6 shows an example for communication between a plurality of communication devices 30b, 30c.

A base station (BS), e.g., the network entity described with reference to FIG. 3, may manage the scheduling and resource allocation of multiple communication device 30b, 30c communicating via Device-to-Device (D2D) (e.g., a sidelink) (e.g., the communication devices as described with reference to FIG. 1, FIG. 2 and FIG. 4) or even to infrastructure or the BS itself. The communication devices 30b, 30c may be equipped with multi-element antenna systems capable of shaping, steering and tuning the directivity/beamwidth of the radiation pattern that they communicate with. Further, the communication devices 30b, 30c may be equipped with M antenna system elements. The BS may allocate to each communication device 30b, 30c a radiation boundary area 60, e.g., a specific area in space based on an antenna footprint (or an angular region in space), determined by e.g., by power constraints, an antenna system capability, etc. Further the BS may allocate a time resource (a time frame/slot) for communication between two communication devices 30b, 30c using the radiation boundary area. Further, the BS may allocate a frequency resource (e.g., a channel/subchannel) for communication between two communication devices 30b, 30c using the radiation boundary area.

The (first) communication device 30b may receive an allocation in time, frequency and/or a space (e.g., a radiation boundary area 60) for a link intended to be established, e.g., to the other (second) communication device 30c. The information about the radiation boundary area (the allocation in space) (and/or a time resource, a frequency resource) may be transmitted to the communication device 30b. Optionally, a power threshold may be transmitted with the information about the allocation in space. The power threshold in dBm should not be exceeded outside of the allocated space, e.g., the radiation boundary area 60. The communication device 30b may translate (information about) the allocated space into local coordinates and may perform variable transformation to represent the allocated space in electric angle variables.

Further, the communication device 30b may then take the allocated space as a constraint in antenna footprint. The constraint may be further used as an Array Factor Limit (AFL). The communication device 30b may perform an Inverse Discrete Fourier Transform (IDFT) of the AFL, to discretize the area as a Fourier series. This Fourier series (e.g., the Fourier Coefficients of the Fourier series) may be transmitted to the BS. Using the Fourier series the communication device 30b may perform beam-shaping by adjusting its antenna system. For example, the communication device 30b may take M (Fourier) coefficients from the Fourier series to recreate the AFL with the antenna system comprising the M antenna system elements.

Further, the communication device 30b may use the coefficients as antenna system weights. For example, the communication device 30b may tune the radiated power to comply with the transmitted power threshold. Further, the communication device 30b may share information related to the used beam-shaping and the targeted allocation within a message, e.g., a broadcast message. For example, the communication device may share a quality metric to indicate the extent to which the used beam-shaping complies with the allocation limit (e.g., a goodness of fit).

The same time resource and/or frequency resource (tile hatching vertical) may be allocated for different communication devices (both unicast and groupcast) across a space, e.g., the coverage area of the BS, for different radiation boundary areas 60. The vertically hatched tiles represent the same time resource and/or frequency resource.

More details and aspects are mentioned in connection with the embodiments described above and/or below. The example shown in FIG. 6 may comprise one or more optional additional features corresponding to one or more aspects mentioned in connection with the proposed concept or one or more examples described above (FIGS. 1-5) and/or below (e.g., FIG. 7-8).

Figure 7:
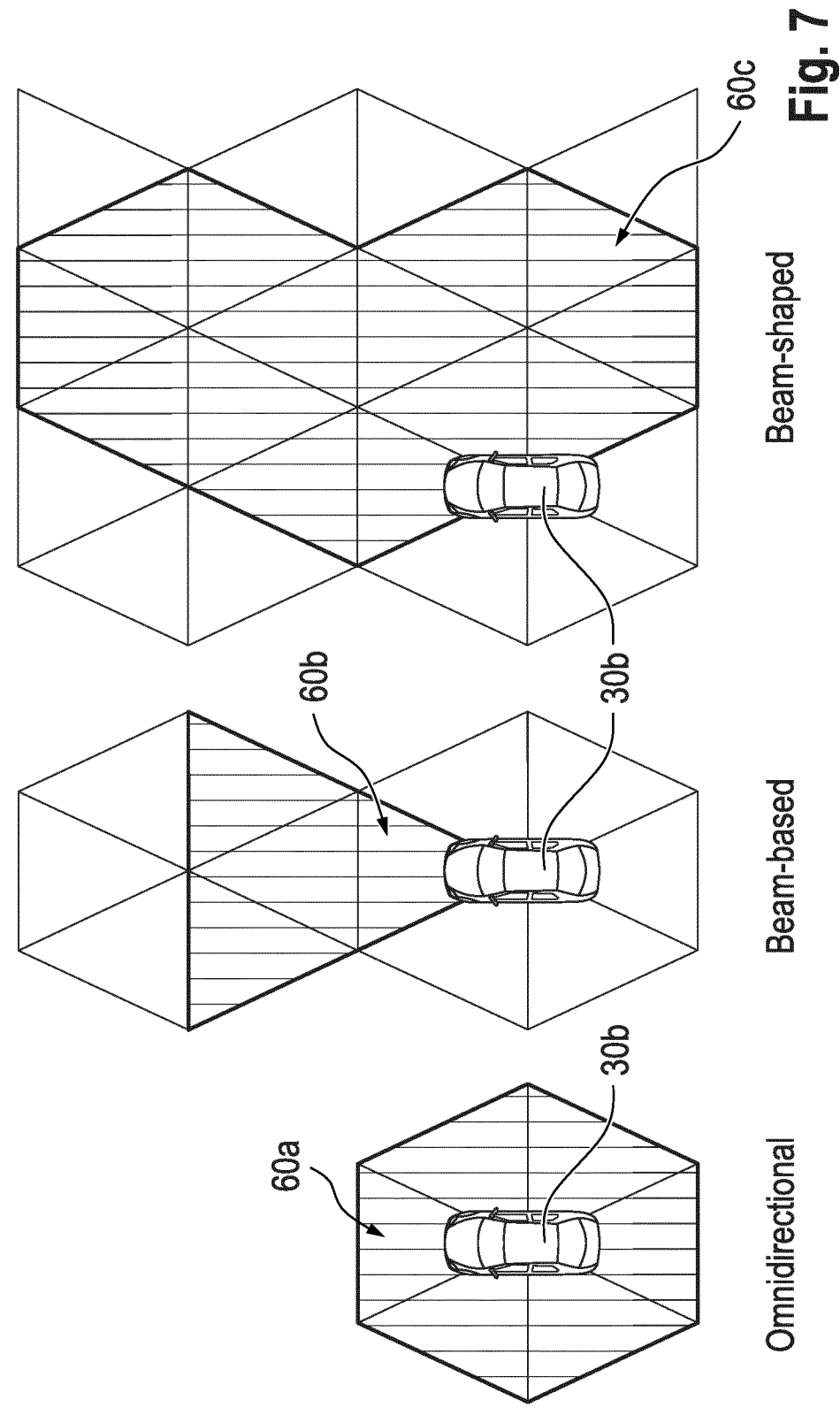
FIG. 7 shows examples of different patterns of a radiation boundary area, according to some aspects of the present disclosure.

FIG. 7 shows examples of different patterns of a radiation boundary area. As can be seen triangular grids (which can be contained in hexagonal grids) can be used to represent the most common antenna footprints. Hexagonal coordinates are customary in world mapping, e.g., maps for vehicle are based normally based on hexagons. Depending on a desired radiation characteristic different tile can be assigned by a network entity to a radiation boundary area. For example, all tiles in a surrounding of the first communication device 30b, e.g., a vehicle 30b, can be assigned to the radiation boundary area 60a. This way, an antenna system of the vehicle 30b may have an omnidirectional radiation pattern. For example, the radiation boundary area 60b may comprise only certain tiles in a forward direction of the vehicle 30b, which can be realized, e.g., with a beam-based shape. For example, the radiation boundary area 60c may comprise only elements on a side of the vehicle 30b, e.g., a right side, which can be achieved with a beam-shaped radiation pattern.

More details and aspects are mentioned in connection with the embodiments described above and/or below. The example shown in FIG. 7 may comprise one or more optional additional features corresponding to one or more aspects mentioned in connection with the proposed concept or one or more examples described above (FIGS. 1-6) and/or below (e.g., FIG. 8).

FIG. 8 shows an example of a triangular grid-base radiation boundary area and an array factor limit representation. FIG. 8a shows an example representation of a triangular grid-based space allocation (radiation boundary area). Three triangles in space are allocated and represent the Array Factor Limit.

FIG. 8b shows the array factor limit represented in polar coordinates (dashed line), together with a Fourier synthesis to comply with the space limitations (dotted line). As can be seen the Fourier syntheses matches the radiation boundary area in a proper way.

More details and aspects are mentioned in connection with the embodiments described above. The example shown in FIG. 8 may comprise one or more optional additional features corresponding to one or more aspects mentioned in connection with the proposed concept or one or more examples described above (FIG. 1-7).

The aspects and features described in relation to a particular one of the previous examples may also be combined with one or more of the further examples to replace an identical or similar feature of that further example or to additionally introduce the features into the further example.

Examples may be compliant to or even comprised in certain standard specifications, such as those specified by the 3GPP. Configuration information may for example be communicated using signaling radio bearers, e.g., by means of Radio Resource Control (RRC) messages, which are, for example, specified in the *.331 series of 3GPP as layer 3 control plane messages. For example, physical layer specification, e.g., by means of Doppler Delay Resolutions and other physical layer specifications may also be affected by present embodiments, e.g., *.201, *.211, *.212, *.213, *.214, *.216 series in the 3GPP specifications.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

If some aspects have been described in relation to a device or system, these aspects should also be understood as a description of the corresponding method and vice versa. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The aspects and features described in relation to a particular one of the previous examples may also be combined with one or more of the further examples to replace an identical or similar feature of that further example or to additionally introduce the features into the further example.

LIST OF REFERENCE SIGNS 30a network entity
32a interface
34a processing circuitry
30b communication device
32b interface
34b processing circuitry
30c communication device
32c interface
34c processing circuitry
41 transmit information about the radiation boundary area
42 transmit information about the radiation boundary area
44 communicate using the radiation boundary area
60, 60a, 60b, 60c radiation boundary area
100 method for a communication device
110 receiving information about a radiation boundary area
120 approximating a parameter for an antenna system
130 configuring the antenna system
140 transmitting information about the radiation pattern
200 method for a first communication device
210 transmitting information about an antenna system capability
220 receiving information about a radiation boundary area
230 configuring the antenna system
300 method for a network entity
310 receiving information from a communication device
320 generating a radiation boundary area
330 transmitting information about the radiation boundary area
400 method for a communication device
410 receiving from the other communication device a radiation boundary area
420 communicating using the received radiation boundary area

What is claimed is:
1. A method for a communication device of a vehicle for controlling a radiation boundary area, comprising:
receiving information about the radiation boundary area, wherein the radiation boundary area is allocated by a network entity;
receiving a threshold for a maximal radiation energy density outside the radiation boundary area;
approximating at least one antenna system parameter of the communication device based on the received information about the radiation boundary area for setting a radiation pattern of the antenna system to the radiation boundary area;
configuring the antenna system to generate a radiation pattern to radiate into the radiation boundary area using the at least one antenna system parameter, such that a radiation energy density outside the radiation boundary area does not exceed the maximal radiation energy density;
transmitting information about the radiation pattern of the antenna system to the network entity;

receiving updated information from the network entity in response to the transmitted information, wherein the updated information comprises information about at least one updated antenna system parameter of the communication device; and configuring the antenna system with the received at least one updated antenna system parameter.

2. The method according to claim 1, further comprising transmitting an antenna system capability of the communication device to the network entity prior to receiving information about the radiation boundary area.

3. The method according to claim 1, further comprising generating a quality metric, which indicates a match of the radiation pattern with the radiation boundary area; and transmitting the quality metric to the network entity.

4. The method according to claim 1, wherein approximating the at least one antenna system parameter comprises performing an inverse discrete Fourier transform of an array factor limit corresponding to the radiation boundary area.

5. The method according to claim 1, wherein approximating the at least one antenna system parameter comprises determining Fourier Coefficients to adjust the radiation pattern of the antenna system to the radiation boundary area.

6. The method according to claim 1, further comprising determining information about an environment of the communication device, and transmitting the information about the environment to the network entity.

7. The method according to claim 1, further comprising determining a movement speed of the communication device and transmitting information about the movement speed of the communication device to the network entity.

8. A vehicle communication system for controlling a radiation boundary area, comprising:

one or more communication interfaces; and a control device comprising a processing apparatus operatively coupled to the one or more communication interfaces, the control device and the one or more communication interfaces being configured to receive information about the radiation boundary area, wherein the radiation boundary area is allocated by a network entity;

receive a threshold for a maximal radiation energy density outside the radiation boundary area;

approximate at least one antenna system parameter of the communication device based on the received information about the radiation boundary area for setting a radiation pattern of the antenna system to the radiation boundary area;

configure the antenna system to generate a radiation pattern to radiate into the radiation boundary area using the at least one antenna system parameter, such that a radiation energy density outside the radiation boundary area does not exceed the maximal radiation energy density;

transmit information about the radiation pattern of the antenna system to the network entity;

receive updated information from the network entity in response to the transmitted information, wherein the updated information comprises information about at least one updated antenna system parameter of the communication device; and configure the antenna system with the received at least one updated antenna system parameter.

9. The vehicle communication system according to claim 8, wherein the control device and one or more communication interfaces are configured to transmit an antenna system capability of the communication device to the network entity prior to receiving information about the radiation boundary area.

10. The vehicle communication system according to claim 8, wherein the control device and one or more communication interfaces are configured to generate a quality metric, which indicates a match of the radiation pattern with the radiation boundary area; and transmit the quality metric to the network entity.

11. The vehicle communication system according to claim 8, wherein the control device and the one or more communication interfaces are configured to approximate the at least one antenna system parameter by performing an inverse discrete Fourier transform of an array factor limit corresponding to the radiation boundary area.

12. The vehicle communication system according to claim 8, wherein the control device and one or more communication interfaces are configured to approximate the at least one antenna system parameter by determining Fourier Coefficients to adjust the radiation pattern of the antenna system to the radiation boundary area.

13. The vehicle communication system according to claim 8, wherein the control device and one or more communication interfaces are configured to determine information about an environment of the communication device, and transmitting the information about the environment to the network entity.

14. The vehicle communication system according to claim 8, wherein the control device and one or more communication interfaces are configured to determine a movement speed of the communication device and transmitting information about the movement speed of the communication device to the network entity.

15. A method for controlling a radiation boundary area of a communication device of a vehicle via a network entity, comprising:

transmitting information about the radiation boundary area, wherein the radiation boundary area is allocated by the network entity, to the communication device;

transmitting a threshold for a maximal radiation energy density outside the radiation boundary area to the communication device;

receiving information about a set radiation pattern of an antenna system of the communication device, wherein the set radiation pattern is based on an approximated antenna system parameter for setting the radiation pattern of the antenna system to the transmitted radiation boundary area;

processing the received information to determine compliance with the radiation boundary area and with the maximal radiation energy density outside the radiation boundary area; and transmitting updated information to the communication device based on the processing, wherein the updated information comprises information about at least one updated antenna system parameter of the communication device.

16. The method according to claim 15, further comprising receiving an antenna system capability of the communication device prior to transmitting information about the radiation boundary area.

17. The method according to claim 15, further comprising receiving a quality metric from the communication device, which indicates a match of the radiation pattern with the radiation boundary area.

18. The method according to claim 15, wherein processing the received information comprises evaluating an array factor limit corresponding to the radiation boundary area and performing an inverse discrete Fourier transform to determine the at least one updated antenna system parameter.

19. The method according to claim 15, wherein the approximated antenna system parameter is based on determined Fourier Coefficients of the communication device for setting the radiation pattern of the antenna system to the radiation boundary area.

20. The method according to claim 15, further comprising receiving and processing at least one of (i) information about an environment of the communication device, and/or (ii) a movement speed of the communication device to determine compliance with the radiation boundary area.

\*   \*   \*   \*   \*